US011384938B2

United States Patent
Matsuo et al.

(10) Patent No.: US 11,384,938 B2
(45) Date of Patent: Jul. 12, 2022

(54) BURNER, BURNER SYSTEM, INTEGRATED GASIFICATION COMBINED CYCLE, AND METHOD FOR MOVING BURNER

(71) Applicant: Mitsubishi Power, Ltd., Yokohama (JP)

(72) Inventors: Kohei Matsuo, Kanagawa (JP); Keisuke Matsuo, Kanagawa (JP); Shinya Hamasaki, Kanagawa (JP)

(73) Assignee: MITSUBISHI POWER, LTD., Yokohama (JP)

( * ) Notice: Subject to any disclaimer, the term of this patent is extended or adjusted under 35 U.S.C. 154(b) by 0 days.

(21) Appl. No.: 17/270,131

(22) PCT Filed: Dec. 20, 2019

(86) PCT No.: PCT/JP2019/050079
§ 371 (c)(1),
(2) Date: Feb. 22, 2021

(87) PCT Pub. No.: WO2020/145090
PCT Pub. Date: Jul. 16, 2020

(65) Prior Publication Data
US 2021/0180790 A1    Jun. 17, 2021

(30) Foreign Application Priority Data
Jan. 11, 2019    (JP) .............................. JP2019-003470

(51) Int. Cl.
*F23R 3/28*    (2006.01)
*F02C 3/22*    (2006.01)
(Continued)

(52) U.S. Cl.
CPC .................. *F23R 3/28* (2013.01); *F02C 3/22* (2013.01); *F23D 14/22* (2013.01); *F23D 14/32* (2013.01); *F23D 14/78* (2013.01)

(58) Field of Classification Search
CPC .... F23R 3/28; F02C 3/22; F23D 14/78; F23D 14/22; F23D 14/32
See application file for complete search history.

(56) References Cited

U.S. PATENT DOCUMENTS

| 3,100,461 A | 8/1963 | Werner |
| 4,073,627 A * | 2/1978 | Anderson .................. C10J 3/08 110/263 |

(Continued)

FOREIGN PATENT DOCUMENTS

| JP | 55-171809 U | 12/1980 |
| JP | 60-196132 U | 12/1985 |

(Continued)

OTHER PUBLICATIONS

International Search Report dated Feb. 18, 2020, issued in counterpart International Application No. PCT/JP2019/050079, with English Translation. (6 pages).

*Primary Examiner* — Craig Kim
(74) *Attorney, Agent, or Firm* — WHDA, LLP

(57) ABSTRACT

To provide a burner that makes it possible to reduce error displacement of the distal end position of a burner main body when the burner main body is inserted. A burner (161) includes: a burner main body (162); a plurality of driving cylinders (163) that are disposed parallel to a direction of an axis line in which the burner main body (162) moves, and drive movement of the burner main body (162); a connecting member that connects the burner main body (162) and the plurality of driving cylinders (163); and a fitting member (170) that is provided between the burner main body (162) and the connecting member, and constrains relative movement in the direction of the axis line (X) and permits relative movement in a direction perpendicular to the direction of the axis line (X).

7 Claims, 6 Drawing Sheets

(51) Int. Cl.
  *F23D 14/78* (2006.01)
  *F23D 14/32* (2006.01)
  *F23D 14/22* (2006.01)

(56) References Cited

U.S. PATENT DOCUMENTS

| | | | | |
|---|---|---|---|---|
| 4,497,475 A | * | 2/1985 | Fuchs | F23C 5/02 |
| | | | | 266/270 |
| 5,511,725 A | * | 4/1996 | Barker | B01J 8/1827 |
| | | | | 239/424 |
| 8,997,665 B2 | * | 4/2015 | Hamasaki | F27D 99/0033 |
| | | | | 110/266 |

FOREIGN PATENT DOCUMENTS

| | | |
|---|---|---|
| JP | 62-225809 | 10/1987 |
| JP | 8-61637 | 3/1996 |
| JP | 3410979 B2 | 5/2003 |
| JP | 4042820 B2 | 2/2008 |
| JP | 2011-252695 A | 12/2011 |

* cited by examiner

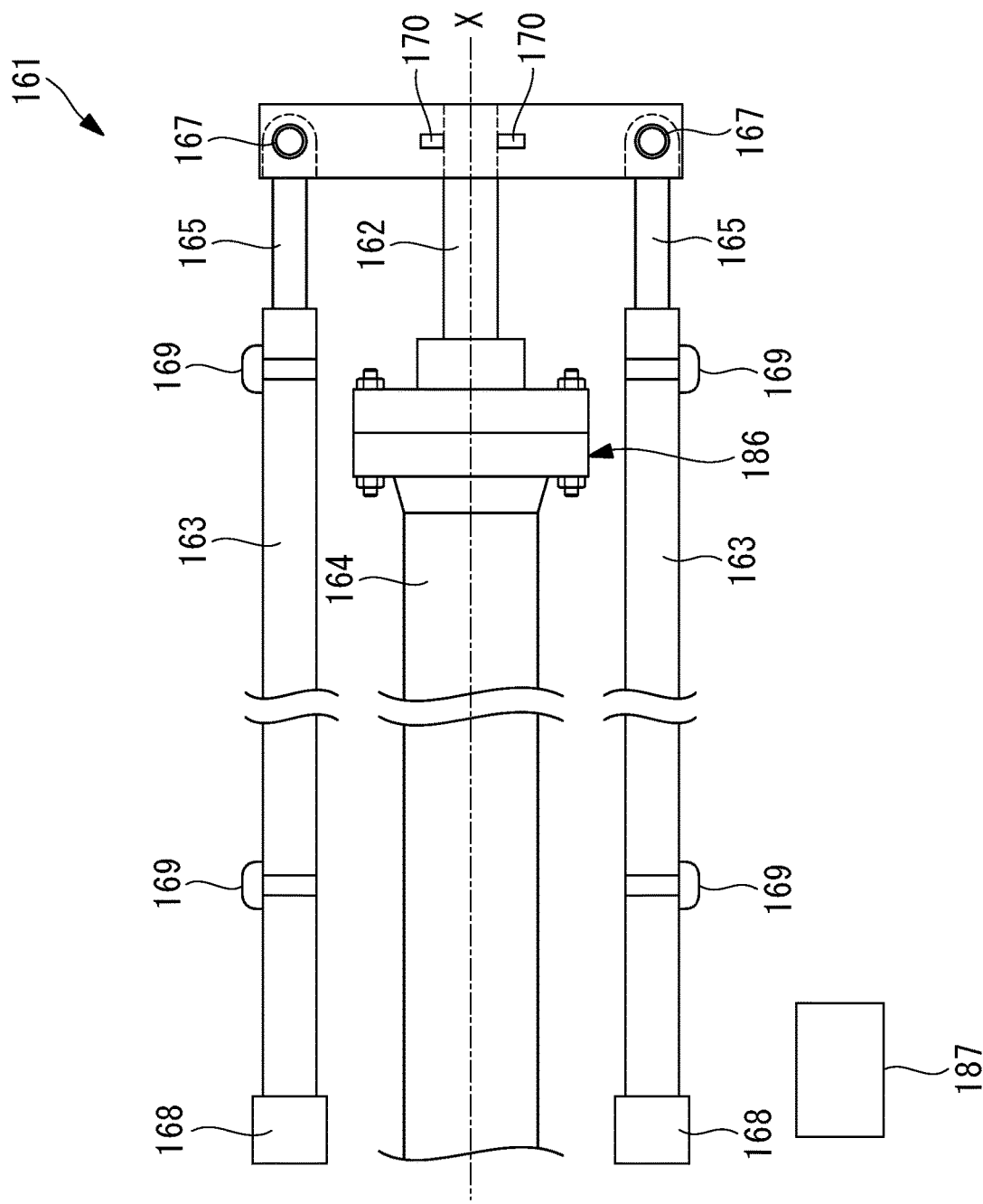

BURNER, BURNER SYSTEM, INTEGRATED GASIFICATION COMBINED CYCLE, AND METHOD FOR MOVING BURNER

TECHNICAL FIELD

The present disclosure relates to a burner, a burner system, an integrated gasification combined cycle, and a method for moving the burner.

BACKGROUND ART

There is known, as a gasifier unit, a carbonaceous fuel gasifier unit (coal gasifier unit) that feeds carbonaceous feedstock such as coal into a gasifier and causes the carbonaceous feedstock to be partially combusted and gasified, thereby producing combustible gas.

Of burners provided in the gasifier, a slag melting burner that melts slag in the gasifier is generally installed in a combustor section provided below a reductor section of the gasifier. The slag melting burner has a multiple-pipe structure including an outer tube and an inner tube (a main body of the slag melting burner). When the slag melting burner is lit and used, the distal end position of the slag melting burner is disposed in a predetermined position inside a gasifier wall so as to be small in error, and a length portion inserted into the inside of the furnace has a long length. The slag melting burner is configured that when it is not in use, the portion inserted into the inside of the gasifier wall can be operated from the outside of the furnace and pulled out to a predetermined position near the gasifier wall so that it is possible to suppress damage due to a high-temperature atmosphere within the gasifier wall. Thus, a distal end portion of the slag melting burner to be inserted into the inside of the gasifier wall is inserted into the inside of the gasifier wall and lit when the slag melting burner is used, and is caused to wait in a state of being retracted to near the gasifier wall when it is not in use, and thereby suppresses damage due to heat within the gasifier wall.

As for an insertion/retraction device that performs insertion and retraction of a burner or the like, for example, technologies such as those in Patent Literatures 1 and 2 described below have been reported. Patent Literature 1 discloses a configuration in which a cylinder for driving and a piston rod are supported by insertion/retraction device supporting hardware or fixing hardware, and the insertion/retraction device supporting hardware is connected to a shut-off valve through an outer tube. Patent Literature 2 discloses a structure in which a holding part fitted into a transmission member makes the axial center of an existing pipe and the axial center of a retraction device coincident.

CITATION LIST

Patent Literature

[PTL 1] Japanese Unexamined Patent Application, Publication No. S62-225809
[PTL 2] the Publication of Japanese Patent No. 3410979

SUMMARY OF INVENTION

Technical Problem

Here, when an insertion/retraction device causes a burner main body of a slag melting burner to make an insertion/retraction movement to/from the inside of a gasifier wall, in a case where a thrust direction of a driving cylinder in the insertion/retraction device does not coincide with a longitudinal axial direction of the burner main body making the insertion/retraction movement, stress caused by a bending moment is generated in each connection between the insertion/retraction device and the burner main body, which produces a load on the connection between the insertion/retraction device and the burner main body. Furthermore, in a case where a plurality of driving cylinders are provided to cause the burner main body to make an insertion/retraction movement, there is a possibility that the driving cylinders are not mutually synchronized, and their thrust direction deflects (varies) to a direction intersecting with the longitudinal axial direction in which the burner main body makes the insertion/retraction movement, and thus the insertion/retraction movement of the burner main body is not made smoothly.

Moreover, even if the angle of deflection caused by discordance of the thrust direction of the driving cylinders and the longitudinal axial direction of the burner main body making the insertion/retraction movement is a small deflection angle, in a case of a burner that the length of a distal end of its burner main body to be inserted is long just like a slag melting burner, error displacement of the distal end position of the burner main body becomes larger, and thus it is necessary to increase the accuracy of position management at the time of insertion of the burner main body, and the management becomes difficult. Therefore, in a case where the position of the distal end of the burner main body when inserted is a position incapable of emission of a jet of fuel toward an intended predetermined position, it fails to sufficiently demonstrate an effect of melting slag when a slag melting burner is used, and there is a fear of degrading the performance of a gasifier.

In this way, when a distal end of a burner main body of a burner that the length of its distal end to be inserted is long makes an insertion/retraction movement, it is necessary to contrive to avoid generation of a bending moment in the burner main body and deflection of the burner main body to a direction intersecting with a longitudinal axial direction that is a direction of the insertion/retraction movement.

The present disclosure has been made in view of such circumstances, and is intended to provide a burner that makes it possible to reduce error displacement of the distal end position of a burner main body when the burner main body is inserted, a burner system and an integrated gasification combined cycle that include the burner, and a method for moving the burner.

Solution to Problem

To solve the above-described problems, the present disclosure adopts the following means.

A burner of the present disclosure includes: a burner main body; a plurality of driving cylinders that are disposed parallel to a direction of an axis line in which the burner main body moves, and drive movement of the burner main body; a connecting member that connects the burner main body and the plurality of driving cylinders; and a fitting member that is provided between the burner main body and the connecting member, and constrains relative movement in the direction of the axis line and permits relative movement in a direction perpendicular to the direction of the axis line.

The burner of the present disclosure can move the burner main body in the direction of the axis line. The plurality of driving cylinders that are disposed parallel to the direction of the axis line that is a moving direction of a distal end of the burner main body and drive movement of the burner main body is connected to the burner main body by the connecting member (a support part). Then, the fitting member (a key) that constrains the relative movement in the direction of the axis line and permits the relative movement in the direction perpendicular to the direction of the axis line is provided between the burner main body and the connecting member. The fitting member constrains the relative movement of the burner main body in the direction of the axis line, and thereby a thrust direction in which thrust of the plurality of driving cylinders is produced coincides with the direction of the axis line of the burner main body, and therefore it is possible to transmit the thrust of the plurality of driving cylinders to the burner main body smoothly. Furthermore, the fitting member is configured to permit the relative movement in the direction perpendicular to the direction of the axis line of the burner main body. Thus, even if an assembly error or the like occurs, it is possible to suppress the occurrence of deflection that is a difference between the direction of the axis line and the thrust direction of the driving cylinders. For example, in a case of the burner that the length of the distal end of the burner main body to be inserted is long just like a slag melting burner, the distal end of the burner main body retracted from the inside of a gasifier wall to near the gasifier wall may be again inserted into the inside of the gasifier wall for a reason of changing the position of the distal end of the burner main body depending on whether or not the burner is used or some other reason. The deflection (for example, variation) between the direction of the axis line of the burner main body (the direction of insertion/retraction movement of the burner main body into/from the inside of the furnace) and the thrust direction of the driving cylinders at this time can be reduced as much as possible. Thus, it is possible to reduce error displacement of the distal end position of the burner main body when inserted. Therefore, it becomes easy to emit a jet of fuel from the distal end of the burner main body toward an intended position, which makes it possible to suitably melt slag.

The above-described burner further includes: a burner-main-body-side groove provided on a periphery-side surface of the burner main body; and a connecting-member-side groove provided on a surface of the connecting member that faces the periphery-side surface of the burner main body in a position that faces the burner-main-body-side groove, in which the fitting member is preferably fitted and fixed into the burner-main-body-side groove and the connecting-member-side groove.

In this way, a key structure is adopted, in which by fitting and fixing the fitting member into the burner-main-body-side groove of the burner main body and the connecting-member-side groove of the connecting member, respective side surfaces that face each other are provided with recessed portions, and the fitting member is provided with a protruding portion that is fitted into the recessed portions. Thus, in a simple structure, the thrust of the plurality of driving cylinders can be more smoothly transmitted to the burner main body.

It is preferable that the above-described burner includes one electric motor that moves the connecting member connecting the plurality of driving cylinders in the direction of the axis line.

In the burner of the present disclosure, the plurality of driving cylinders are moved by one electric motor and also stopped by the one electric motor; therefore, the plurality of driving cylinders can be driven collectively in synchronization with one another, and the movement of the connecting member connecting the plurality of driving cylinders in the direction of the axis line can be certainly stopped.

In the above-described burner, it is preferable that each of the plurality of driving cylinders be provided with a limit switch that detects displacement of each of the driving cylinders in the direction of the axis line, and, when pressed down, transmits a stop signal regarding stop of the plurality of driving cylinders, and the electric motor stops movement of each of the plurality of driving cylinders on the basis of an output of the limit switch.

By providing each of the plurality of driving cylinders with the limit switch that detects displacement of the driving cylinders in the direction of the axis line and stops the movement of the driving cylinders, it becomes possible to stop the plurality of driving cylinders simultaneously in synchronization with one another. Thus, it is possible to stop the movement of the burner main body in the direction of the axis line with accuracy. The control of the limit switches can be configured to be performed by, for example, a striker that moves following the movement of the driving cylinder in the direction of the axis line.

The present disclosure provides a burner system including: the above-described burner; and a control section that controls movement of the plurality of driving cylinders in the direction of the axis line.

The burner system of the present disclosure includes the burner in which burner main body and the plurality of driving cylinders are connected by the connecting member, and is provided with the fitting member (a key) that constrains the relative movement in the direction of the axis line and permits the relative movement in the direction perpendicular to the direction of the axis line between the burner main body and the connecting member. Therefore, even if the control of again inserting the distal end of the burner main body retracted from the inside of the gasifier wall to near the gasifier wall into the inside of the gasifier wall, for example, for a reason of changing the position of the distal end of the burner main body depending on whether or not the burner is used or some other reason is performed, it is possible to reduce as much as possible the deflection (for example, variation) between the direction of the axis line of the burner main body (the direction of insertion/retraction movement of the burner main body into/from the inside of the furnace) and the thrust direction of the driving cylinders. Thus, it is possible to reduce error displacement of the distal end position of the burner main body when inserted. Therefore, it becomes easy to emit a jet of fuel from the distal end of the burner main body toward an intended position, which makes it possible to suitably melt slag.

The present disclosure provides an integrated gasification combined cycle including: a gasifier that partially combusts and gasifies carbonaceous feedstock that contains carbon; the above-described burner provided in the gasifier; a gas turbine that is driven to rotate by combusting at least a portion of raw syngas produced in the gasifier; a steam turbine that is driven to rotate with steam produced in a heat recovery steam generator into which turbine flue gas discharged from the gas turbine is introduced; and a generator that is rotationally coupled to the gas turbine and/or the steam turbine.

The integrated gasification combined cycle of the present disclosure includes the above-described burner, and therefore can emit a jet of fuel from the distal end of the burner toward an intended position, which makes it possible to suitably melt slag. Thus, the integrated gasification combined cycle is highly reliable.

The present disclosure provides a method for moving a burner including: a burner main body; a plurality of driving cylinders that are disposed parallel to a direction of an axis line in which the burner main body moves, and drive movement of the burner main body; a connecting member that connects the burner main body and the plurality of driving cylinders; and a fitting member that is provided between the burner main body and the connecting member, and constrains relative movement in the direction of the axis line and permits relative movement in a direction perpendicular to the direction of the axis line, the method including a moving step of moving the plurality of driving cylinders in directions of respective axis lines of the plurality of driving cylinders, thereby moving the burner main body in the direction of the axis line of the burner main body.

In the method for moving the burner of the present disclosure, the burner in which the plurality of driving cylinders are connected to the burner main body by the connecting member (the support part) is used; the plurality of driving cylinders are disposed parallel to the direction of the axis line that is the moving direction of the distal end of the burner main body, and drive movement of the burner main body. Then, in this burner, the fitting member (the key) is provided between the burner main body and the connecting member; the fitting member constrains the relative movement in the direction of the axis line, and permits the relative movement in the direction perpendicular to the direction of the axis line. The fitting member constrains the relative movement of the burner main body in the direction of the axis line, and thereby a direction of movement caused by the thrust of the plurality of driving cylinders coincides with the direction of the axis line of the burner main body, and therefore it is possible to transmit the thrust of the plurality of driving cylinders to the burner main body smoothly at the moving step. Furthermore, the fitting member is configured to permit the relative movement of the burner main body in the direction perpendicular to the direction of the axis line; thus, even if an assembly error or the like occurs, it is possible to suppress deflection that is a difference between the direction of the axis line and the thrust direction of the driving cylinders. For example, in a case of the burner that the length of the distal end of the burner main body to be inserted is long just like a slag melting burner, it is possible to reduce as much as possible the deflection (for example, variation) between the direction of the axis line of the burner main body (the direction of insertion/retraction movement of the burner main body into/from the inside of the furnace) and the thrust direction of the driving cylinders when the distal end of the burner main body retracted from the inside of the gasifier wall to near the gasifier wall is again inserted into the inside of the gasifier wall for a reason of changing the position of the distal end of the burner main body depending on whether or not the burner is used or some other reason. Thus, it is possible to reduce error displacement of the distal end position of the burner main body when inserted. Therefore, it becomes easy to emit a jet of fuel from the distal end of the burner main body toward an intended position, which makes it possible to suitably melt slag.

Advantageous Effects of Invention

The burner according to the present disclosure can reduce as much as possible the deflection between the direction of the axis line in which the burner main body makes insertion/retraction movement and the thrust direction of the driving cylinders. Thus, it is possible to reduce error displacement of the distal end position of the burner main body when inserted.

BRIEF DESCRIPTION OF DRAWINGS

FIG. 3 is a top view showing a configuration of a burner according to the embodiment of the present disclosure.

DESCRIPTION OF EMBODIMENTS

An embodiment of a burner, a burner system, an integrated gasification combined cycle, and a method for moving the burner according to the present disclosure will be described below with reference to drawings. It is to be noted that in the present embodiment, the "upper" indicates a vertically upward direction in a vertical direction, and the "lower" indicates a vertically downward direction in the vertical direction.

[Integrated Coal Gasification Combined Cycle (Integrated Gasification Combined Cycle)]

A burner according to an embodiment of the present disclosure is described below with reference to drawings.

Figure 1:
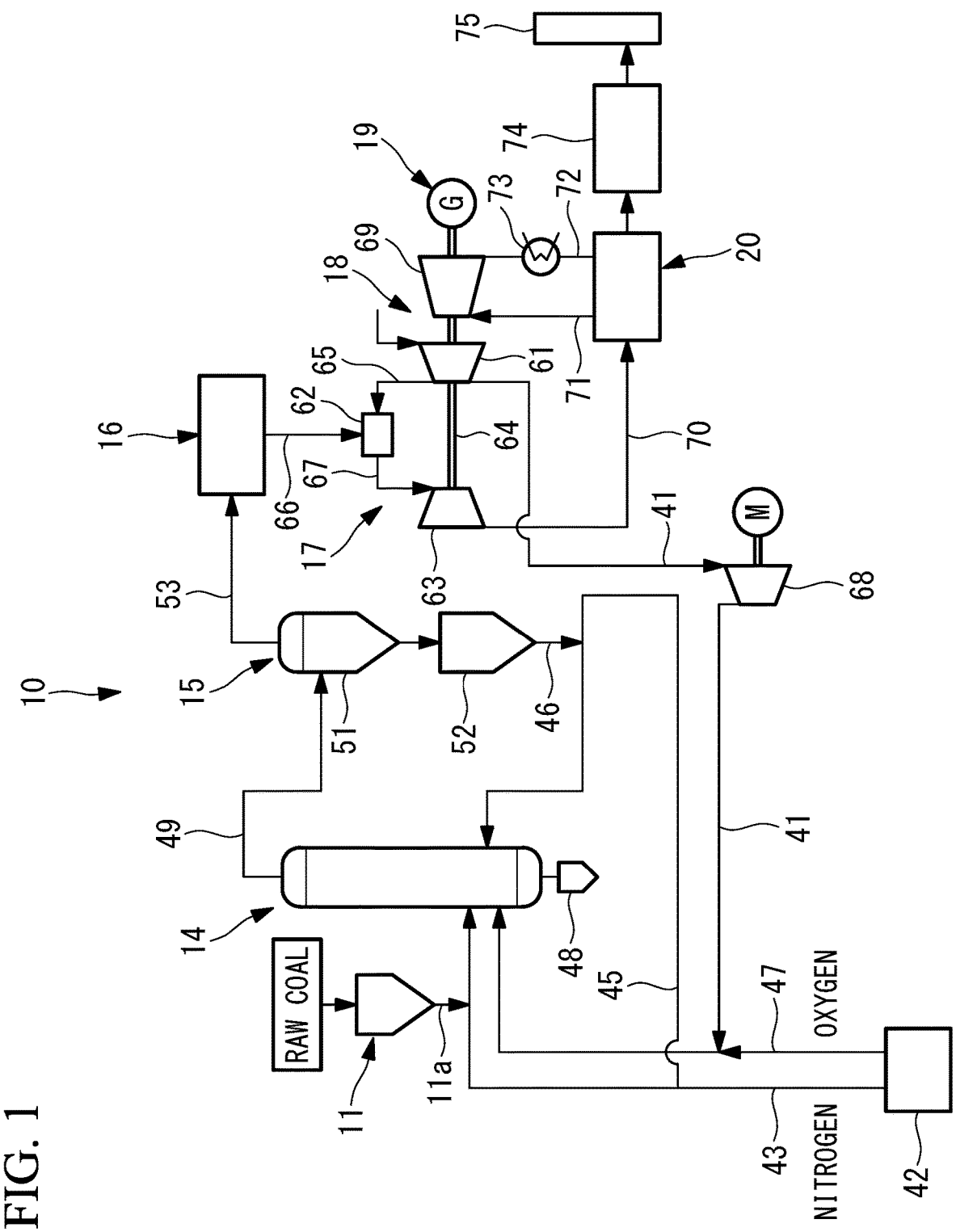
FIG. 1 is a schematic configuration diagram of an integrated coal gasification combined cycle according to an embodiment of the present disclosure.

FIG. 1 is a schematic configuration diagram of an integrated coal gasification combined cycle applied with the burner according to the present embodiment.

An integrated coal gasification combined cycle (IGCC) 10 applied with a gasifier unit 14 according to the present embodiment adopts an air combustion system that uses mainly air as oxygen containing gas, and produces combustible gas (raw syngas) from fuel in the gasifier unit 14. Then, after purifying the raw syngas produced in the gasifier unit 14 into fuel gas in a gas clean-up unit 16, the integrated coal gasification combined cycle 10 feeds the fuel gas into a gas turbine 17 thereby generating electric power. That is, the integrated coal gasification combined cycle 10 according to the present embodiment is an air-combustion (air-blown) power unit. As fuel fed into the gasifier unit 14, for example, carbonaceous feedstock such as coal is used.

As shown in FIG. 1, the integrated coal gasification combined cycle (integrated gasification combined cycle) 10 includes a coal feeding unit 11, the gasifier unit 14, a char recovery unit 15, the gas clean-up unit 16, the gas turbine 17, a steam turbine 18, a generator 19, and a heat recovery steam generator (HRSG) 20.

The coal feeding unit 11 is fed with, as raw coal, coal that is carbonaceous feedstock, and pulverizes the coal using a coal mill (not shown) or the like, thereby producing pulverized coal pulverized into fine particles. The pulverized coal produced in the coal feeding unit 11 is pressurized with nitrogen gas as inert gas for conveyance fed from a later-described air separation unit 42 at an outlet of a coal feed line 11a and is fed into the gasifier unit 14. Inert gas is inactive gas with oxygen content of about 5 vol % or less, and includes, as representative examples, nitrogen gas, carbon dioxide gas, argon gas, etc.; however, it is not necessarily limited to be about 5 vol % or less.

The gasifier unit 14 is fed with the pulverized coal produced in the coal feeding unit 11, and is also fed with char (unreacted content and ash content of coal) recovered in the char recovery unit 15 for the purpose of reuse.

The gasifier unit 14 is connected with a compressed air feed line 41 from the gas turbine 17 (a compressor 61); a portion of compressed air compressed in the gas turbine 17 is boosted to a predetermined pressure by a booster 68 and can be fed into the gasifier unit 14. The air separation unit 42 separates and generates nitrogen and oxygen from air in the atmosphere; the air separation unit 42 and the gasifier unit 14 are connected by a first nitrogen feed line 43. Then, this first nitrogen feed line 43 is connected with the coal feed line 11a from the coal feeding unit 11. A second nitrogen feed line 45 that diverges from the first nitrogen feed line 43 is also connected to the gasifier unit 14; this second nitrogen feed line 45 is connected with a char return line 46 from the char recovery unit 15. Furthermore, the air separation unit 42 is connected to the compressed air feed line 41 by an oxygen feed line 47. Then, the nitrogen separated by the air separation unit 42 circulates through the first nitrogen feed line 43 and the second nitrogen feed line 45, thereby being used as gas for conveyance of coal and char. The oxygen separated by the air separation unit 42 circulates through the oxygen feed line 47 and the compressed air feed line 41, thereby being used as oxygen containing gas in the gasifier unit 14.

Figure 2:
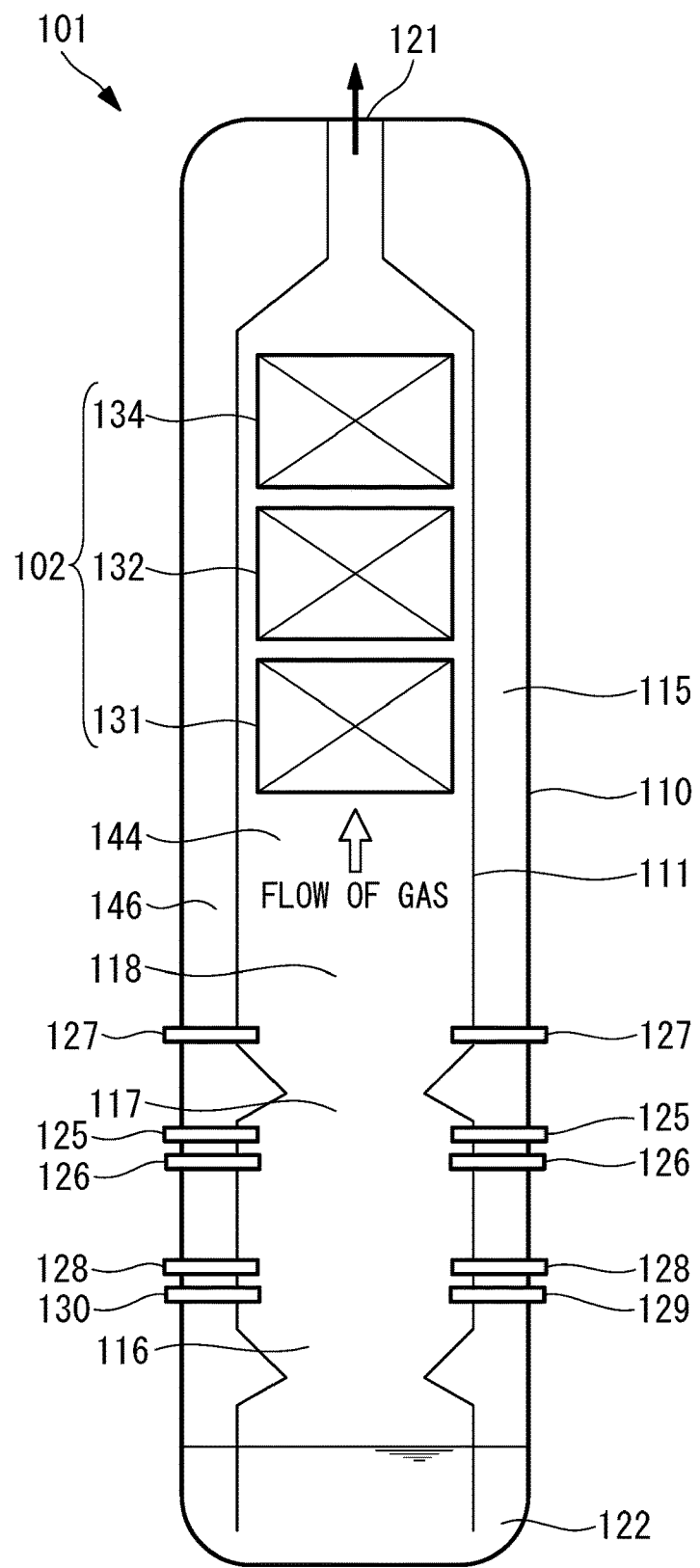
FIG. 2 is a schematic configuration diagram showing a gasifier unit shown in FIG. 1.

The gasifier unit 14 includes, for example, a two-stage entrained bed type gasifier 101 (see FIG. 2). The gasifier unit 14 partially combusts the coal (pulverized coal) and char fed into the inside thereof with oxygen containing gas (air, oxygen), thereby gasifying them into raw syngas. It is to be noted that the gasifier unit 14 is provided with a foreign material disassembling unit 48 that removes foreign material (slag) mixed into the pulverized coal. Then, this gasifier unit 14 is connected with a raw syngas line 49 to feed raw syngas into the char recovery unit 15, which makes it possible to discharge raw syngas including char. In this case, the raw syngas line 49 may be provided with a syngas cooler 102 (a gas cooler) as shown in FIG. 2, and the raw syngas may be cooled to a predetermined temperature and then fed into the char recovery unit 15.

The char recovery unit 15 includes a dust collecting unit 51 and a feed hopper 52. In this case, the dust collecting unit 51 includes one or more cyclones or porous filters, and can separate char included in the raw syngas produced in the gasifier unit 14. Then, the raw syngas from which char has been separated is fed into the gas clean-up unit 16 through a gas discharge line 53. The feed hopper 52 accumulates the char separated from the raw syngas in the dust collecting unit 51. It is to be noted that a bin may be provided between the dust collecting unit 51 and the feed hopper 52, and a plurality of feed hoppers 52 may be configured to be connected to this bin. Then, the char return line 46 from the feed hopper 52 is connected to the second nitrogen feed line 45.

The gas clean-up unit 16 removes impurities such as a sulfur compound and a nitrogen compound from the raw syngas from which char has been separated by the char recovery unit 15, thereby performing gas purification. Then, the gas clean-up unit 16 purifies the raw syngas and produces fuel gas, and feed the fuel gas into the gas turbine 17. It is to be noted that the raw syngas from which char has been separated still includes sulfur content (such as $H_2S$); therefore, in this gas clean-up unit 16, the sulfur content is removed and collected with an amine absorbent or the like and used effectively.

The gas turbine 17 includes the compressor 61, a combustor 62, and a turbine 63; the compressor 61 and the turbine 63 are joined by a rotating shaft 64. The combustor 62 is connected with a compressed air feed line 65 from the compressor 61, and connected with a fuel gas feed line 66 from the gas clean-up unit 16, and further connected with a combustion gas feed line 67 extending toward the turbine 63. The gas turbine 17 is provided with the compressed air feed line 41 extending from the compressor 61 to the gasifier unit 14, and the booster 68 is provided midway in the compressed air feed line 41. Therefore, the combustor 62 mixes a portion of compressed air fed from the compressor 61 and at least a portion of fuel gas fed from the gas clean-up unit 16, and combusts the mixture thereby producing combustion gas, and feeds the produced combustion gas into the turbine 63. Then, the turbine 63 drives the rotating shaft 64 to rotate with the fed combustion gas, thereby driving the generator 19 to rotate.

The steam turbine 18 includes a turbine 69 coupled to the rotating shaft 64 of the gas turbine 17, and the generator 19 is coupled to a base end of this rotating shaft 64. The heat recovery steam generator 20 is connected with a flue gas line 70 from the gas turbine 17 (the turbine 63), and performs heat exchange between water fed into the heat recovery steam generator 20 and flue gas of the turbine 63, thereby producing steam. Then, the heat recovery steam generator 20 is provided with a steam feed line 71 and a steam recovery line 72 between the steam turbine 18 and the turbine 69, and the steam recovery line 72 is provided with a condenser 73. The steam produced in the heat recovery steam generator 20 may include steam produced by the syngas cooler 102 of the gasifier 101 through heat exchange with raw syngas. Therefore, in the steam turbine 18, the turbine 69 is driven to rotate by the steam fed from the heat recovery steam generator 20, and rotates the rotating shaft 64, thereby driving the generator 19 to rotate.

Then, a gas cleaning unit 74 is provided between an outlet of the heat recovery steam generator 20 and a stack 75.

Here, the working of the integrated coal gasification combined cycle 10 in the present embodiment is described.

In the integrated coal gasification combined cycle 10 in the present embodiment, when raw coal (coal) is fed into the coal feeding unit 11, the coal is pulverized into fine particles and becomes pulverized coal in the coal feeding unit 11. By nitrogen fed from the air separation unit 42, the pulverized coal produced in the coal feeding unit 11 is caused to circulate through the first nitrogen feed line 43 and be fed into the gasifier unit 14. Furthermore, by the nitrogen fed from the air separation unit 42, char recovered in the char recovery unit 15 to be described later is caused to circulate through the second nitrogen feed line 45 and be fed into the gasifier unit 14. Moreover, after compressed air extracted from the gas turbine 17 to be described later is boosted by the booster 68, the compressed air is fed into the gasifier unit 14 through the compressed air feed line 41 together with oxygen fed from the air separation unit 42.

In the gasifier unit 14, the fed pulverized coal and char are combusted with the compressed air (the oxygen), and the pulverized coal and the char are gasified, and thereby raw syngas is produced. Then, this raw syngas is discharged from the gasifier unit 14 through the raw syngas line 49 and fed into the char recovery unit 15.

In this char recovery unit 15, the raw syngas is first fed into the dust collecting unit 51, and thereby particulate char included in the raw syngas is separated. Then, the raw syngas from which the char has been separated is fed into the gas clean-up unit 16 through the gas discharge line 53. Meanwhile, the particulate char separated from the raw syngas is accumulated in the feed hopper 52, and is returned to the gasifier unit 14 through the char return line 46 and recycled.

In the gas clean-up unit 16, the raw syngas from which the char has been separated by the char recovery unit 15 is subjected to gas purification in which impurities such as a sulfur compound and a nitrogen compound are removed from the raw syngas, and fuel gas is produced. The compressor 61 produces and feeds compressed air into the combustor 62. This combustor 62 mixes the compressed air fed from the compressor 61 and the fuel gas fed from the gas clean-up unit 16, and combusts the mixture thereby producing combustion gas. The turbine 63 is driven to rotate by this combustion gas, thereby driving the compressor 61 and the generator 19 to rotate through the rotating shaft 64. In this way, the gas turbine 17 can generate electric power.

Then, the heat recovery steam generator 20 performs heat exchange between flue gas discharged from the turbine 63 in the gas turbine 17 and water fed into the heat recovery steam generator 20, thereby producing steam, and feeds this produced steam into the steam turbine 18. In the steam turbine 18, the turbine 69 is driven to rotate by the steam fed from the heat recovery steam generator 20, and thereby the generator 19 is driven to rotate through the rotating shaft 64, and electric power can be generated. It is to be noted that the gas turbine 17 and the steam turbine 18 may not drive one generator 19 to rotate as the same axis, and may drive a plurality of generators to rotate as different axes.

After that, in the gas cleaning unit 74, hazardous substances of discharged gas discharged from the heat recovery steam generator 20 are removed, and the cleaned discharged gas is released into the atmosphere through the stack 75.

Subsequently, the gasifier unit 14 in the above-described integrated coal gasification combined cycle 10 is described in detail with reference to FIGS. 1 and 2. FIG. 2 is a schematic configuration diagram showing the gasifier unit shown in FIG. 1.

As shown in FIG. 2, the gasifier unit 14 includes the gasifier 101 and the syngas cooler 102.

The gasifier 101 is provided to extend in a vertical direction; pulverized coal and oxygen are fed into its vertically lower side, and partially combusted and gasified raw syngas circulates from the vertically lower side to upper side. The gasifier 101 includes a pressure vessel 110 and a gasifier wall (a furnace wall) 111 provided inside the pressure vessel 110. Then, the gasifier 101 is provided with an annulus section 115 in a space between the pressure vessel 110 and the gasifier wall 111. The gasifier 101 is provided with, in order from the vertically lower side (i.e., the upstream side in a circulating direction of raw syngas), a combustor section 116, a diffuser section 117, and a reductor section 118 in a space inside the gasifier wall 111.

The pressure vessel 110 is formed into a tube with a hollow space inside, and is provided with a gas discharge outlet 121 on its upper end and a slag bath 122 on its lower end (bottom). The gasifier wall 111 is formed into a tube with a hollow space inside, and its wall surface is provided to face an inner surface of the pressure vessel 110. In the present embodiment, the pressure vessel 110 is formed into, for example, a cylinder, and the diffuser section 117 of the gasifier wall 111 is also formed into, for example, a cylinder. Then, the gasifier wall 111 is coupled to the inner surface of the pressure vessel 110 by a not-shown support member.

The gasifier wall 111 separates the inside of the pressure vessel 110 into an inner space 144 and an outer space 146. As will be described later, the gasifier wall 111 has a shape that varies in transverse cross-section shape in the diffuser section 117 between the combustor section 116 and the reductor section 118. An upper end, an end on the vertically upper side, of the gasifier wall 111 is connected to the gas discharge outlet 121 of the pressure vessel 110, and its lower end, an end on the vertically lower side, is provided to be spaced apart from the bottom of the pressure vessel 110. Then, accumulated water is accumulated in the slag bath 122 provided on the bottom of the pressure vessel 110; the lower end of the gasifier wall 111 is immersed in the accumulated water, and thereby the inside and the outside of the gasifier wall 111 is sealed. Various burners are inserted into the gasifier wall 111, and the syngas cooler 102 is disposed in the inner space 144. The structure of the gasifier wall 111 will be described later.

The annulus section 115 is a space formed inside the pressure vessel 110 and outside the gasifier wall 111, i.e., the outer space 146, and is fed with, for example, nitrogen that is inactive gas separated in the air separation unit 42 through a not-shown nitrogen feed line. Thus, the annulus section 115 becomes a space filled with nitrogen. It is to be noted that a not-shown furnace pressure equalizer for equalizing the pressure in the gasifier 101 is provided near the upper part of this annulus section 115 in the vertical direction. The furnace pressure equalizer is provided to communicate between the inside and the outside of the gasifier wall 111, and makes their pressure substantially uniform so that a difference in pressure between the inside (the combustor section 116, the diffuser section 117, and the reductor section 118) and the outside (the annulus section 115) of the gasifier wall 111 is within a predetermined pressure.

The combustor section 116 is a space in which pulverized coal and char and air are partially combusted. In the present embodiment, a combustion device including, in order from the inside-of-furnace upper side, for example, a plurality of char burners 125, a plurality of combustor-related pulverized coal burners (burners) 126, a plurality of slag melting burners 128, an igniter 129, and a light oil burner 130 is disposed on the gasifier wall 111 in the combustor section 116. The slag melting burners 128 are for melting produced solidified slag. A distal end of each slag melting burners 128 is inserted about 1 m to 1.5 m toward near the center of the inside of the furnace, and the length of a portion of the distal end to be inserted is structured to be long. The igniter 129 and the light oil burner 130 are used to start the gasifier 101. High-temperature combustion gas that has combusted the pulverized coal and a portion of the char in the combustor section 116 passes through the diffuser section 117 and then flows into the reductor section 118.

The reductor section 118 is a space kept in a high-temperature state required for a gasification reaction and in which pulverized coal is fed to combustion gas from the combustor section 116 and is partially oxidized and combusted, and the pulverized coal is broken down into volatile matter contents (carbon monoxide, hydrogen, low hydrocarbon, etc.) and gasified, and then raw syngas is produced. A combustion device including a plurality of reductor-related pulverized coal burners (burners) 127 is disposed on the gasifier wall 111 in the reductor section 118.

The syngas cooler 102 is provided inside the gasifier wall 111 and on the vertically upper side of the burner 127 of the reductor section 118. The syngas cooler 102 is a heat exchanger, and in which, in order from the vertically lower side of the gasifier wall 111 (i.e., the upstream side in the circulating direction of raw syngas), an evaporator 131, a superheater 132, and an economizer 134 are disposed. This syngas cooler 102 performs heat exchange with raw syngas produced in the reductor section 118, thereby cooling the raw syngas. The respective numbers of the evaporators 131, the superheaters 132, and the economizers 134 are not limited to those shown in the drawing.

Here, the operation of the above-described gasifier unit 14 is described.

In the gasifier unit 14, nitrogen and pulverized coal are fed into the gasifier 101 and lit by the burners 127 of the reductor section 118, and pulverized coal and char and compressed air (oxygen) are fed into the gasifier 101 and lit by the char burners 125 and the burners 126 of the combustor section 116. Then, in the combustor section 116, high-temperature combustion gas is produced by combustion of the pulverized coal and the char. Furthermore, in the combustor section 116, melting slag is produced in high-temperature gas by the combustion of the pulverized coal and the char. This melting slag is attached to the gasifier wall 111, and falls to the furnace bottom, and eventually is discharged into stored water in the slag bath 122. Then, the high-temperature combustion gas produced in the combustor section 116 goes up to the reductor section 118 through the diffuser section 117. In this reductor section 118 kept in a high-temperature state required for a gasification reaction, pulverized coal is mixed with the high-temperature combustion gas, and the pulverized coal is partially oxidized and combusted in a high-temperature reducing atmosphere, which develops a gasification reaction, and raw syngas is produced. The gasified raw syngas circulates from the vertically lower side to upper side.

Subsequently, the burner according to the present embodiment is described with FIG. 3. The burner according to the present embodiment is applied to, for example, the slag melting burner 128 shown in FIG. 2.

FIG. 3 is a top view showing a configuration of the burner according to the present embodiment. In FIG. 3, a right-hand direction in the plane of paper indicates the outside-of-furnace side, and a left-hand direction in the plane of paper indicates the inside-of-furnace side. A burner 161 in the present embodiment includes a burner main body (an inner tube) 162 and a plurality of driving cylinders 163 (in the present embodiment, two driving cylinders 163 provided on the horizontally right and left sides with respect to an axis line X of the burner main body 162 so as to hold the burner main body 162 between them). The driving cylinders 163 are disposed parallel to a direction of the axis line X that is a moving direction of a distal end of the burner main body 162, and drive the burner main body 162 to move. The periphery of an inside-of-furnace-side portion of the burner main body 162 is covered with an outer tube 164 through a flange part 186.

The two driving cylinders 163 have a hollow structure, and a rod part 165 is slidably inserted into the inside of each driving cylinder 163. An outside-of-furnace-side end of each rod part 165 projects more than an outside-of-furnace-side end of the driving cylinder 163, and is fixed by connecting a link pin 167 to a connecting member 166 to be described later so as to be able to turn centering around the link pin 167. An inside-of-furnace-side end of each driving cylinder 163 is connected to a ball screw driving part 168.

Each of the driving cylinders 163 is provided with limit switches 169 in different positions in a direction of their own axis line X (in the present embodiment, two points spaced apart by a predetermined distance on the inside-of-furnace side and outside-of-furnace side of each driving cylinder 163, i.e., a total of four points in the burner 161). The limit switch 169 detects displacement to a direction intersecting with the direction of the axis line X of each driving cylinder 163, and controls the stop of the driving cylinder 163 (when pressed down, transmits a stop signal regarding the stop of the driving cylinder 163). In the present embodiment, on the basis of any of outputs of the limit switches 169 in the four points, the two driving cylinders 163 are configured to stop moving collectively.

The burner main body 162 and the two driving cylinders 163 are connected by the connecting member (a support part) 166 on the outside-of-furnace side. A fitting member (a key) 170 is provided between the burner main body 162 and the connecting member 166. The fitting member 170 constrains the relative movement of the burner main body 162 in the direction of the axis line X, and permits the relative movement in the vertical direction intersecting with the direction of the axis line X. In the present embodiment, two fitting members 170 are provided on the horizontally right and left sides with respect to the axis line X of the burner main body 162. Examples of material of the fitting member 170 include carbon steel for machine construction (S25C).

Subsequently, a configuration in which the fitting member in the present embodiment is fitted into between the burner main body and the connecting member is described in more detail with FIGS. 4A and 4B.

Figure 4A:
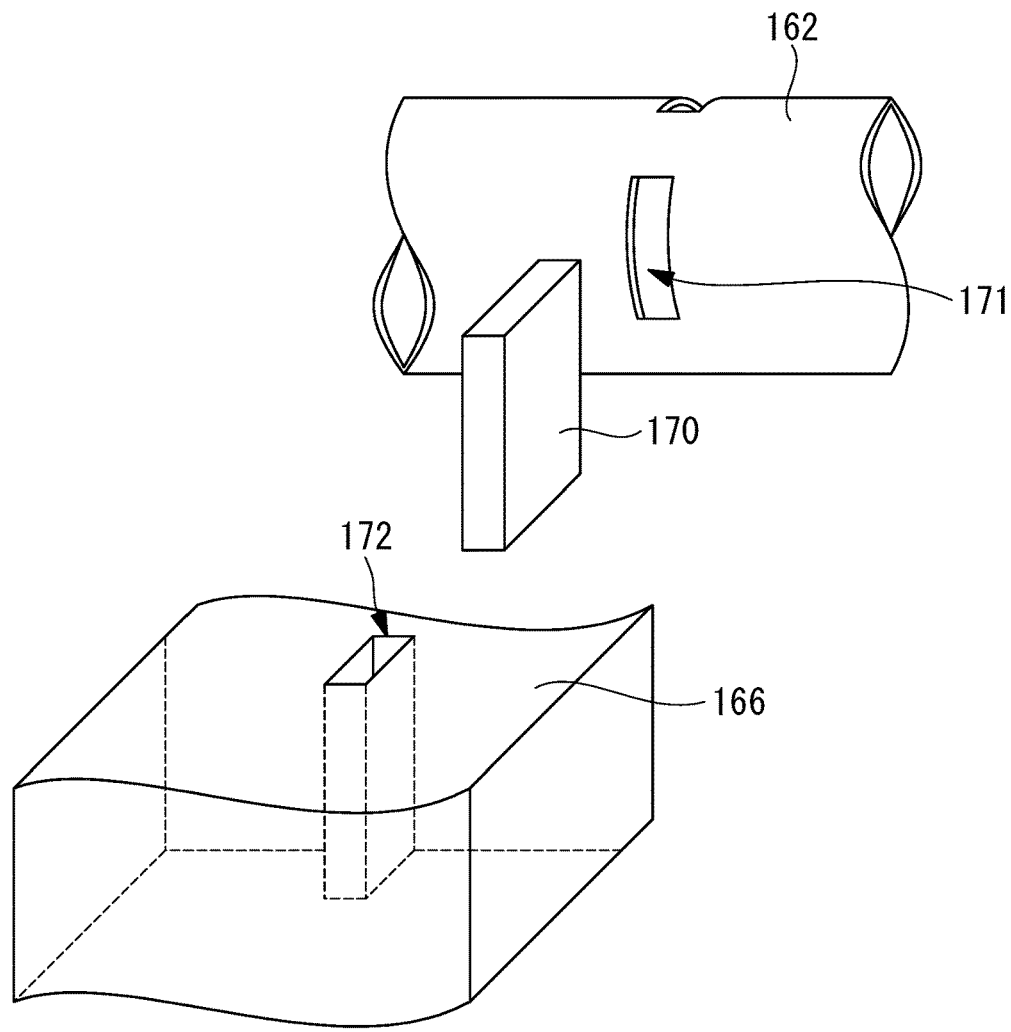
FIG. 4A is a perspective view showing an image of how a fitting member is fitted into between a burner main body and a connecting member.

FIG. 4A is a perspective view showing an image of how the fitting member is fitted into between the burner main body and the connecting member. FIG. 4B is a longitudinal cross-sectional view showing a configuration of the neighborhood of the fitting member shown in FIG. 3. It is to be noted that in FIGS. 4A and 4B, the same configuration as that is in FIG. 3 is assigned the same reference numeral, and its detailed description is omitted.

As shown in FIG. 4A, the fitting member 170 is a rectangular parallelepiped plate-like member. Both periphery-side surfaces of the burner main body 162 are each provided with a burner-main-body-side groove 171, and a surface of the connecting member 166 that faces the periphery-side surface of the burner main body 162 is provided with a connecting-member-side groove 172 in a position that faces the burner-main-body-side groove 171. An opening portion of the burner-main-body-side groove 171 and an opening portion of the connecting-member-side groove 172 have a rectangular shape to correspond to the shape of the fitting member 170, and go through to the bottom (a lower surface) of the connecting member 166. With its both sides inserted into the burner-main-body-side groove 171 and the connecting-member-side groove 172 from the vertically upward/downward direction, the fitting member 170 is fitted, and fixed by the burner-main-body-side groove 171 or the connecting-member-side groove 172 so as not to come off.

Figure 4B:
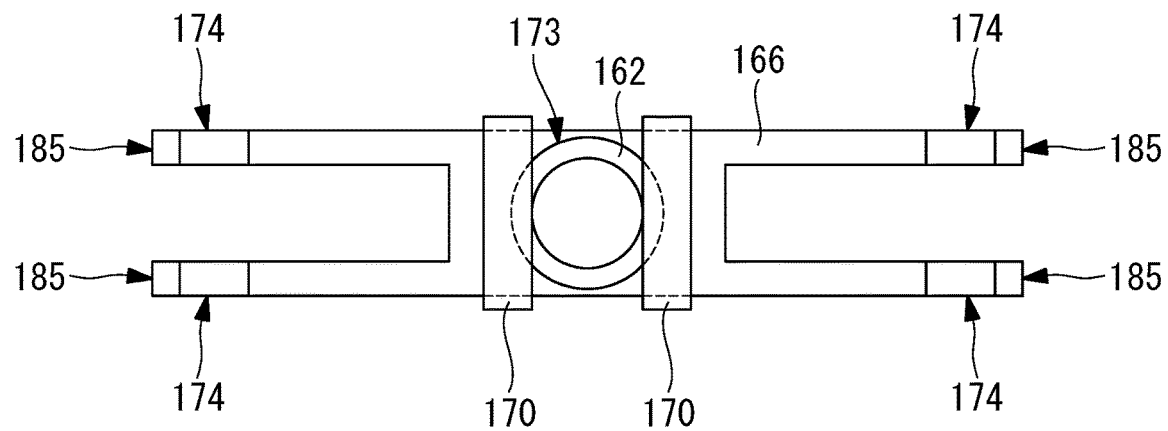
FIG. 4B is a longitudinal cross-sectional view showing a configuration of the neighborhood of the fitting member shown in FIG. 3.

As shown in FIG. 4B, the connecting member 166 is, for example, a lateral H-shaped one-piece member, and two end portions 185 extend on each of its right and left sides. The center of the connecting member 166 is provided with a circular opening portion 173. The burner main body 162 is inserted into the opening portion 173, and the two fitting members 170 are inserted from the vertically upward/downward direction and fitted/fixed into both right and left sides of the burner main body 162. The four end portions 185 of the connecting member 166 are each provided with a pin hole 174 for insertion of the link pin 167 (see FIG. 3). The connecting member 166 is fixed by the link pins 167 on its both right and left sides so that the rod parts 165 of the above-described driving cylinders 163 can make a linear movement in the longitudinal axial direction. The connecting member 166 is fixed so as to be able to turn centering around the link pin 167, and thus does not become an obstacle to permit the relative movement between the burner main body 162 and the connecting member 166 in the vertical direction with respect to the direction of the axis line X.

Subsequently, a moving mechanism of the burner in the present embodiment is described in more detail with FIG. 5.

Figure 5:
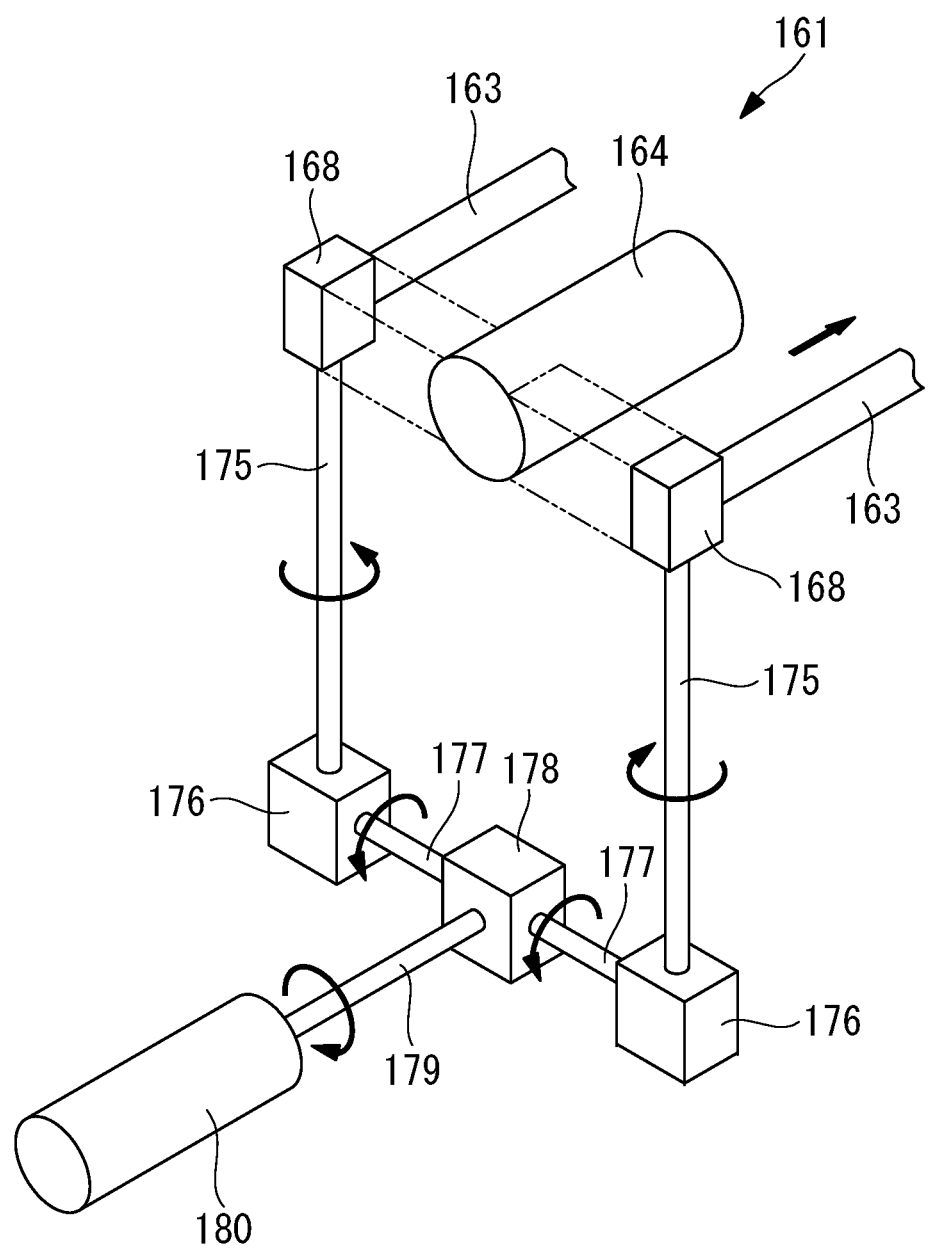
FIG. 5 is a perspective view showing a configuration of the neighborhood of a ball screw driving part in the burner according to the embodiment of the present disclosure.

FIG. 5 is a perspective view showing a configuration of the neighborhood of a ball screw driving part in the burner according to the present embodiment. A rotating arrow in FIG. 5 indicates a rotating direction of each driving shaft, and a linear arrow in FIG. 5 indicates a direction of insertion/retraction movement of the burner (a direction of the outside of the furnace).

As shown in FIG. 5, each ball screw driving part 168 is connected to a gearbox 176 through a driving shaft 175 connected to its vertically lower side, and is merged with a gearbox 178 through a driving shaft 177 horizontally connected to each gearbox 176. The inside-of-furnace side of the gearbox 178 is connected with one electric motor (with a brake) 180 through a driving shaft 179. In this way, the gearbox 178 and the electric motor 180 are disposed in the lower side of the burner 161. The driving cylinder 163, the gearbox 178, and the electric motor 180 are fixed to a not-shown mount, and the outer tube 164 of the burner 161 is installed on the mount.

The electric motor 180 is configured to move the rod part 165 (see FIG. 3) housed in each driving cylinder 163 in the direction of the axis line X and to stop the driving cylinder 163 on the basis of outputs of the above-described limit switches 169. The rotation of the electric motor 180 transmits a rotation driving force from the gearbox 178, through the driving shaft 177, the gearbox 176, and the driving shaft 175, to each ball screw driving part 168 to be in synchronization with one another. Through the synchronized ball screw driving part 168, the driving cylinder 163 is driven to go straight ahead to be in synchronization with it and produces thrust, which moves the connecting member 166.

Subsequently, respective configurations of the driving cylinder and the rod part in the present embodiment is described in more detail with FIG. 6.

Figure 6:
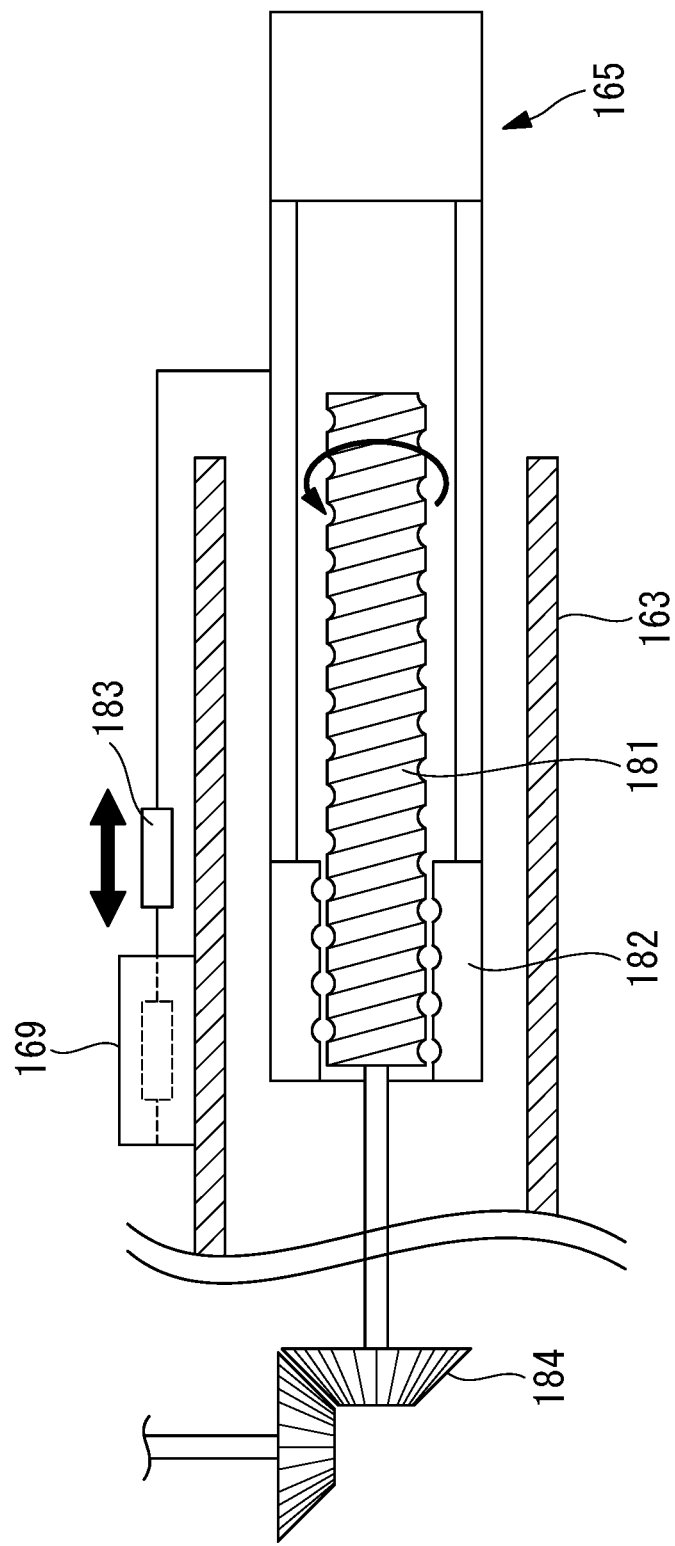
FIG. 6 is a schematic top cross-sectional view showing a driving cylinder and a rod part shown in FIG. 3.

FIG. 6 is a schematic top cross-sectional view showing the driving cylinder and the rod part shown in FIG. 3. It is to be noted that in FIG. 6, the same configuration as that is in FIG. 3 is assigned the same reference numeral, and its detailed description is omitted. A two-way arrow in FIG. 6 indicates a moving direction of a striker, and a rotating arrow indicates a rotating direction of a ball screw.

As shown in FIG. 6, the inside-of-furnace side of the rod part 165 has, for example, a hollow structure, and a ball screw 181 is inserted into the inside thereof. This ball screw 181 is rotatably held by a nut 182 provided on an inner circumferential surface of an inside-of-furnace-side end of the rod part 165. A striker 183 is connected to an outer circumferential surface of the rod part 165. The striker 183 follows the movement of the driving cylinder 163 in the direction of the axis line X and moves outside of the driving cylinder 163. One striker 183 is provided to each driving cylinder 163. The striker 183 manages the position of the rod part 165 that moves together with the rod part 165 thereby making a linear movement. By the striker 183 moving and coming in contact with or moving away from the limit switch 169, ON/OFF of the limit switch 169 is controlled.

The inside-of-furnace side of the ball screw 181 is connected to a gear 184, and the rotation driving force from the electric motor 180 shown in FIG. 5 is transmitted to the ball screw 181 by the gear 184. Specifically, when the electric motor 180 shown in FIG. 5 rotates, its rotation driving force is transmitted to the ball screw 181 by the gear 184, and the nut 182 and the rod part 165 make a linear movement, and a distal end of the rod part 165 is elongated and contracted with respect to the driving cylinder 163. In this way, respective rotating forces of the ball screw 181 and the nut 182 are converted into a linear movement of the rod part 165.

[Burner System]

Subsequently, the burner system according to the present embodiment is described.

It is to be noted that in the following, as the burner system, one including a control section that controls the burner 161 shown in FIG. 3 is described as an example, but this is not restrictive.

The burner system in the present embodiment includes the above-described burner 161 and a control section 187 that controls the movement of the plurality of driving cylinders 163 in the directions of their respective axis lines X. The control section 187 includes, for example, a central processing unit (CPU), a random access memory (RAM), a read-only memory (ROM), a computer-readable storage medium, etc. Then, a series of processes for realizing various functions has been stored, for example, in a storage medium or the like in the form of a program. The CPU reads this program into the RAM or the like, and, by performing processing of information and arithmetic processing, the various functions are realized. It is to be noted that it may be applied to other forms, such as a form in which the program is installed in the ROM or another storage medium in advance, a form of providing the program in a condition of being stored in a computer-readable storage medium, and a form of delivering the program through a communication means by wired or wireless connection. The computer-readable storage medium is a magnetic disk, a magneto-optical disk, a CD-ROM, a DVD-ROM, a semiconductor memory, or the like.

In the above-described burner system, for example, in a case where the distal end of the burner main body 162 is caused to make a retraction movement from the inside of the gasifier wall 111 for a reason of disuse of the burner or some other reason, the control section 187 moves the driving cylinder 163 toward near the gasifier wall 111 along the direction of the axis line X of the driving cylinder 163. Thus, thrust of the driving cylinder 163 is transmitted to the burner main body 162 through the connecting member 166, and the distal end of the burner main body 162 is moved in a direction of being retracted from the inside of the gasifier wall 111 to near the gasifier wall 111 along the axis line X.

On the other hand, in a case where the distal end of the burner main body 162 is inserted into the inside of the gasifier wall 111 for a reason of use of the burner or some other reason, the control section 187 moves the driving cylinder 163 toward the inside of the gasifier wall 111 along the direction of the axis line X of the driving cylinder 163. Thus, thrust of the driving cylinder 163 is transmitted to the burner main body 162 through the connecting member 166, and the distal end of the burner main body 162 is moved in a direction of being inserted from near the gasifier wall 111 into the inside of the gasifier wall 111 along the axis line X.

[Method for Moving Burner]

Subsequently, the method for moving the burner according to the present embodiment is described.

It is to be noted that in the following, with the burner 161 shown in FIG. 3 as an example, a case where the burner 161 makes a movement is described, but this is not restrictive.

(Moving Step)

In a moving step, the plurality of driving cylinders 163 are moved in the directions of their respective axis lines X of the driving cylinders 163, and thereby the burner main body 162 is moved along the direction of the axis line X of the burner main body 162.

For example, in a case where the distal end of the burner main body 162 is retracted from the inside of the gasifier wall 111 to near the gasifier wall 111 for a reason of disuse or some other reason, the driving cylinders 163 are moved toward the outside-of-furnace side along the directions of their respective axis lines X of the driving cylinders 163. Thus, thrust of the driving cylinders 163 is transmitted to the burner main body 162 through the connecting member 166, and the burner main body 162 is moved in a direction of being retracted from the inside of the furnace to the outside-of-furnace side along the axis line X.

On the other hand, in a case where the distal end of the burner main body 162 is inserted into the inside of the gasifier wall 111 for a reason of use or some other reason, the driving cylinders 163 are moved toward the inside of the gasifier wall 111 along the directions of their respective axis lines X of the driving cylinders 163. Thus, thrust of the driving cylinders 163 is transmitted to the burner main body 162 through the connecting member 166, and the distal end of the burner main body 162 is moved in a direction of being inserted from near the gasifier wall 111 into the inside of the gasifier wall 111 along the axis line X.

According to the present embodiment, the above-described configurations make it possible to achieve the following workings and effects.

In the burner 161 in the present embodiment, the plurality of driving cylinders 163 are connected to the burner main body 162 by the connecting member (the support part) 166; the driving cylinders 163 are disposed parallel to the direction of the axis line X that is the moving direction of the distal end of the burner main body 162, and drive the burner main body 162 to move. Then, the fitting member (the key) 170 is provided between the burner main body 162 and the connecting member 166; the fitting member 170 constrains the relative movement in the direction of the axis line X, and permits the relative movement in an orthogonal direction intersecting with the direction of the axis line X. The fitting member 170 constrains the relative movement of the burner main body 162 in the direction of the axis line X, and thereby a thrust direction in which thrust of the plurality of driving cylinders 163 is produced coincides with the direction of the axis line X of the burner 161, and therefore it is possible to transmit the thrust of the plurality of driving cylinders 163 to the burner main body 162 smoothly. Furthermore, the fitting member 170 is configured to permit the relative movement of the burner main body 162 in the orthogonal direction intersecting with the direction of the axis line X. Thus, even if an assembly error or the like occurs, it is possible to suppress the occurrence of deflection that is a difference between the direction of the axis line X and the thrust direction of the driving cylinders 163. For example, in a case of the burner 161 that the length of the distal end of the burner main body 162 to be inserted is long just like a slag melting burner, it is possible to reduce as much as possible the deflection (for example, variation) between the direction of the axis line X of the burner main body 162 (the direction of insertion/retraction movement of the burner main body 162 into/from the inside of the furnace) and the thrust direction of the driving cylinders 163 when the distal end of the burner main body 162 retracted from the inside of the gasifier wall 111 to near the gasifier wall 111 is again inserted into the inside of the gasifier wall 111 for a reason of changing the position of the distal end of the burner main body 162 depending on whether or not the burner 161 is used or some other reason. Thus, it is possible to reduce error displacement of the distal end position of the burner main body 162 when inserted. Therefore, it becomes easy to emit a jet of fuel from the distal end of the burner main body 162 toward an intended position, which makes it possible to suitably melt slag.

A key structure is adopted, in which by fitting and fixing the fitting member 170 into the burner-main-body-side groove 171 of the burner main body 162 and the connecting-member-side groove 172 of the connecting member 166, respective side surfaces that face each other are provided with recessed portions, and the fitting member 170 is provided with a protruding portion that is fitted into the recessed portions. Thus, in a simple structure, the thrust of the plurality of driving cylinders 163 can be more smoothly transmitted to the burner main body 162.

In the burner 161 in the present embodiment, the connecting member 166 connecting the plurality of driving cylinders 163 is moved by one electric motor 180 and also stopped by the one electric motor 180; therefore, the driving cylinders 163 are driven collectively in synchronization with one another, and the movement of the connecting member 166 connecting the plurality of driving cylinders 163 can be certainly stopped in the direction of the axis line X.

Each of the driving cylinders 163 is provided with the limit switches 169 that detect displacement from the direction of the axis line X of each driving cylinder 163, and stop the movement of the driving cylinder 163, which makes it possible to stop the driving cylinders 163 simultaneously in synchronization with one another. Thus, it is possible to stop the burner main body 162 with accuracy. The control of the limit switches 169 can be configured to be performed by, for example, the striker 183 that moves following the movement of the driving cylinder 163 in the direction of the axis line X.

In the burner system of the present embodiment, for example, even if the control of again inserting the distal end of the burner main body 162 retracted from the inside of the gasifier wall 111 to near the gasifier wall 111 into the inside of the gasifier wall 111 for a reason of changing the position of the distal end of the burner main body depending on whether or not the burner is used or some other reason is performed, it is possible to reduce as much as possible the deflection (for example, variation) between the direction of the axis line X of the burner main body 162 (the direction of insertion/retraction movement of the burner main body 162 into/from the inside of the gasifier wall 111) and the thrust direction of the driving cylinders 163. Thus, it is possible to reduce error displacement of the distal end position of the burner main body 162 when inserted. Therefore, it becomes easy to emit a jet of fuel from the distal end of the burner main body 162 toward an intended position, which makes it possible to suitably melt slag.

The integrated gasification combined cycle 10 of the present embodiment includes the above-described burner 161, and therefore can emit a jet of fuel from the distal end of the burner 161 toward an intended position, which makes it possible to suitably melt slag. Thus, the integrated gasification combined cycle 10 is highly reliable.

In the method for moving the burner of the present embodiment, the burner 161 in which the plurality of driving cylinders 163 are connected to the burner main body 162 by the connecting member (the support part) 166 is used; the driving cylinders 163 are disposed parallel to the direction of the axis line X that is the moving direction of the distal end of the burner main body 162, and drive the burner main body 162 to move. Then, in this burner 161, the fitting member (the key) 170 is provided between the burner main body 162 and the connecting member 166; the fitting member 170 constrains the relative movement in the direction of the axis line X, and permits the relative movement in the orthogonal direction intersecting with the direction of the axis line X. The fitting member 170 constrains the relative movement of the burner main body 162 in the direction of the axis line X, and thereby the thrust direction in which thrust of the plurality of driving cylinders 163 is produced coincides with the direction of the axis line X of the burner 161, and therefore it is possible to transmit the thrust of the plurality of driving cylinders 163 to the burner main body 162 smoothly at the moving step. Furthermore, the fitting member 170 is configured to permit the relative movement of the burner main body 162 in the orthogonal direction intersecting with the direction of the axis line X. Thus, even if an assembly error or the like occurs, it is possible to suppress the occurrence of deflection that is a difference between the direction of the axis line X of the burner main body 162 and the thrust direction of the driving cylinders 163. For example, in a case of the burner 161 that the length of the distal end of the burner main body 162 to be inserted is long just like a slag melting burner, it is possible to reduce as much as possible the deflection (for example, variation) between the direction of the axis line X of the burner main body 162 (the direction of insertion/retraction movement of the burner main body 162 into/from the inside of the furnace) and the thrust direction of the driving cylinders 163 when the distal end of the burner main body 162 retracted from the inside of the gasifier wall 111 to near the gasifier wall 111 is again inserted into the inside of the gasifier wall 111 for a reason of changing the position of the distal end of the burner main body 162 depending on whether or not the burner 161 is used or some other reason. Thus, it is possible to reduce error displacement of the distal end position of the burner main body 162 when inserted. Therefore, it becomes easy to emit a jet of fuel from the distal end of the burner main body 162 toward an intended position, which makes it possible to suitably melt slag.

It is to be noted that in the above-described embodiment, there is described, as an example, an aspect in which two fitting members 170 are provided on the horizontally right and left sides with respect to the axis line X, but this is not restrictive. Specifically, the number of fitting members 170 may be one, or may be three or more. The shape of the fitting member 170 is also not limited to a rectangular parallelepiped shape, and may be changed to any shapes such as a cubic shape, a polygon shape, and an elliptic cylindrical shape.

In the above-described embodiment, there is described, as an example, a case where two driving cylinders 163 are provided on the horizontally right and left sides with respect to the axis line X of the burner main body 162, but this is not restrictive. Specifically, as long as the number of driving cylinders 163 is more than one, the number of driving cylinders 163 may be any number, and may be three or more. The disposition positions of the driving cylinders 163 are not limited to the horizontally right and left sides with respect to an axis line X of the burner main body 162; as long as they are parallel to the axis line X of the burner main body 162, they may be disposed in any positions.

In the above-described embodiment, there is described, as an example, a case where the connecting member 166 connecting the two driving cylinders 163 is a one-piece member; however, it may be separate members. Specifically, with respect to each of the driving cylinders 163, a different connecting member 166 may be connected to each driving cylinder 163.

In the above-described embodiment, there is described, as an example, the IGCC including a coal gasifier that produces combustible gas from pulverized coal; however, the gasifier unit of the present disclosure can also be applied to ones that gasify other carbonaceous feedstock, for example, biomass fuel such as thinned wood, scrap wood, driftwood, grass, waste, sludge, and tire. Furthermore, not limited to the one for power generation, the gasifier unit of the present disclosure can also be applied to a gasifier for a chemical plant that obtains a desired chemical substance.

In the above-described embodiment, coal is used as fuel; however, even other carbonaceous feedstock, such as high-grade coal or low-grade coal, can be used. Furthermore, not limited to coal, fuel may be biomass fuel used as renewable organic resources made from living organisms, for example, thinned wood, scrap wood, driftwood, grass, waste, sludge, tire, recycle fuel (pellets, chips) using these as raw material, etc. can also be used.

In the present embodiment, the tower type gasifier has been described as the gasifier 101; however, even if the gasifier 101 is a crossover type gasifier, the operation can be similarly performed by adjusting the respective vertically upward/downward directions of devices in the gasifier 101 so as to balance their gas flow directions of raw syngas.

REFERENCE SIGNS LIST 10 integrated coal gasification combined cycle (integrated gasification combined cycle)
11 coal feeding unit
11a coal feed line
14 gasifier unit
15 char recovery unit
16 gas clean-up unit
17 gas turbine
18 steam turbine
19 generator
20 heat recovery steam generator
41 compressed air feed line
42 air separation unit
43 first nitrogen feed line
45 second nitrogen feed line
46 char return line
47 oxygen feed line
48 foreign material disassembling unit
49 raw syngas line
51 dust collecting unit
52 feed hopper
53 gas discharge line
61 compressor
52 combustor
63 turbine
64 rotating shaft
65 compressed air feed line
66 fuel gas feed line
67 combustion gas feed line
68 booster 69 turbine
70 flue gas line
71 steam feed line
72 steam recovery line
73 condenser
74 gas cleaning unit
75 stack
101 gasifier
102 syngas cooler
110 pressure vessel
111 gasifier wall (furnace wall)
115 annulus section
116 combustor section
117 diffuser section
118 reductor section
121 gas discharge outlet
122 slag bath
125 char burner
126 burner (combustor-related pulverized coal burner)
127 burner (reductor-related pulverized coal burner)
128 slag melting burner
129 igniter
130 light oil burner
131 evaporator
132 superheater
134 economizer
144 inner space
146 outer space
161 burner
162 burner main body (inner tube)
163 driving cylinder
164 outer tube
165 rod part
166 connecting member (support part)
167 link pin
168 ball screw driving part
169 limit switch
170 fitting member (key)
171 burner-main-body-side groove
172 connecting-member-side groove
173 opening portion
174 pin hole
175 driving shaft
176 gearbox
177 driving shaft
178 gearbox
179 driving shaft
180 electric motor (with brake)
181 ball screw
182 nut
183 striker
184 gear
185 end portion
186 flange part
187 control section
X axis line

The invention claimed is:

1. A burner comprising:
a burner main body;
a plurality of driving cylinders that are disposed parallel to a direction of an axis line in which the burner main body moves, and drive movement of the burner main body;
a connecting member that connects the burner main body and the plurality of driving cylinders; and
a fitting member that is provided between the burner main body and the connecting member, and constrains relative movement in the direction of the axis line and permits relative movement in a direction perpendicular to the direction of the axis line.

2. The burner according to claim 1, further comprising:
a burner-main-body-side groove provided on a periphery-side surface of the burner main body; and
a connecting-member-side groove provided on a surface of the connecting member that faces the periphery-side surface of the burner main body in a position that faces the burner-main-body-side groove,
wherein the fitting member is fitted and fixed into the burner-main-body-side groove and the connecting-member-side groove.

3. The burner according to claim 1, comprising one electric motor that moves the connecting member connecting the plurality of driving cylinders in the direction of the axis line.

4. The burner according to claim 3, wherein each of the plurality of driving cylinders is provided with a limit switch that detects displacement of each of the driving cylinders in the direction of the axis line, and, when pressed down, transmits a stop signal regarding stop of the plurality of driving cylinders, and the electric motor stops movement of each of the plurality of driving cylinders on a basis of an output of the limit switch.

5. A burner system comprising:
the burner according to claim 1; and
a control section that controls movement of the plurality of driving cylinders in the direction of the axis line.

6. An integrated gasification combined cycle comprising:
a gasifier that partially combusts and gasifies carbonaceous feedstock that contains carbon;
the burner according to claim 1 provided in the gasifier;
a gas turbine that is driven to rotate by combusting at least a portion of raw syngas produced in the gasifier;
a steam turbine that is driven to rotate with steam produced in a heat recovery steam generator into which turbine flue gas discharged from the gas turbine is introduced; and
a generator that is rotationally coupled to the gas turbine and/or the steam turbine.

7. A method for moving a burner including: a burner main body; a plurality of driving cylinders that are disposed parallel to a direction of an axis line in which the burner main body moves, and drive movement of the burner main body; a connecting member that connects the burner main body and the plurality of driving cylinders; and a fitting member that is provided between the burner main body and the connecting member, and constrains relative movement in the direction of the axis line and permits relative movement in a direction perpendicular to the direction of the axis line, the method comprising
a moving step of moving the plurality of driving cylinders in directions of respective axis lines of the plurality of driving cylinders, thereby moving the burner main body in the direction of the axis line of the burner main body.

* * * * *